United States Patent
Blaxland et al.

(10) Patent No.: US 9,489,444 B2
(45) Date of Patent: Nov. 8, 2016

(54) DETERMINING ASSOCIATIONS BETWEEN MEDIA OBJECTS

(71) Applicant: Comcast Cable Holdings, LLC, Philadelphia, PA (US)

(72) Inventors: Thomas A. Blaxland, West Chester, PA (US); Jason Epstein, Philadelphia, PA (US); Rangarirayi Muvavarirwa, Denver, CO (US); Jonathan T. Moore, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 114 days.

(21) Appl. No.: 13/743,180

(22) Filed: Jan. 16, 2013

(65) Prior Publication Data
US 2013/0138677 A1    May 30, 2013

Related U.S. Application Data

(63) Continuation of application No. 12/137,265, filed on Jun. 11, 2008, now Pat. No. 8,370,396.

(51) Int. Cl.
*G06F 17/30* (2006.01)
*G06Q 30/02* (2012.01)

(52) U.S. Cl.
CPC ..... *G06F 17/30595* (2013.01); *G06F 17/3082* (2013.01); *G06F 17/30572* (2013.01); *G06F 17/30828* (2013.01); *G06Q 30/02* (2013.01)

(58) Field of Classification Search
USPC ........................................................ 707/758
See application file for complete search history.

(56) References Cited

U.S. PATENT DOCUMENTS

| 5,734,444 | A  | 3/1998 | Yoshinobu |
| 6,704,931 | B1 | 3/2004 | Schaffer et al. |
| 6,973,663 | B1 | 12/2005 | Brown et al. |
| 7,269,590 | B2 | 9/2007 | Hull et al. |
| 7,320,468 | B2 | 1/2008 | Morgan |
| 7,506,024 | B2 | 3/2009 | Benitez et al. |
| 7,599,935 | B2 | 10/2009 | La Rotonda et al. |
| 7,774,708 | B2 * | 8/2010 | Bell et al. ............... 715/738 |

(Continued)

FOREIGN PATENT DOCUMENTS

| CA | 2726278 | 11/2010 |
| EP | 09763617.9 | 11/2010 |
| WO | WO PCT/US09/47036 | 6/2008 |

OTHER PUBLICATIONS

International Search Report for PCT/US2009/047036, completed Sep. 21, 2009.

(Continued)

*Primary Examiner* — Debbie Le
(74) *Attorney, Agent, or Firm* — Banner & Witcoff, Ltd.

(57) ABSTRACT

A system for correlating a user's interests to media content, said system comprising: (a) at least one data store comprising media content data relating to people, works, and tags; (b) a relationship generator configured to generate direct relationships among said people, works and tags; (c) a connection module to generate connections between a primary person, work or tag and a first set of said people, works, and tags, wherein each person, work and tag of said first set has a direct relationship with said primary person, work or tag; and (d) a display module for causing the display of at least a portion of said first set of said people, works and tags.

20 Claims, 10 Drawing Sheets

(56) References Cited

U.S. PATENT DOCUMENTS

| | | | |
|---|---|---|---|
| 7,886,024 B2* | 2/2011 | Kelly et al. | 709/219 |
| 8,015,192 B2* | 9/2011 | Rathod et al. | 707/748 |
| 8,300,953 B2* | 10/2012 | Lindley et al. | 382/219 |
| 8,370,396 B2* | 2/2013 | Blaxland et al. | 707/800 |
| 8,370,459 B2* | 2/2013 | Goldeen et al. | 709/219 |
| 2006/0129917 A1* | 6/2006 | Volk | G06F 17/2247 715/201 |
| 2007/0073725 A1 | 3/2007 | Klein, Jr. et al. | |
| 2007/0073728 A1 | 3/2007 | Klein, Jr. et al. | |
| 2008/0086422 A1* | 4/2008 | Wolff et al. | 705/50 |
| 2009/0049082 A1* | 2/2009 | Slaney et al. | 707/103 R |
| 2009/0076881 A1 | 3/2009 | Svendsen | |
| 2009/0132520 A1 | 5/2009 | Nemeth et al. | |
| 2009/0307261 A1* | 12/2009 | Lindley et al. | 707/103 R |
| 2010/0131464 A1* | 5/2010 | Geleijnse et al. | 707/611 |
| 2010/0223646 A1* | 9/2010 | Goldeen et al. | 725/46 |

OTHER PUBLICATIONS

Extended European Search Report for EP 09763617.9, mailed Sep. 21, 2012.

Canadian Office Action—CA Appl. 2,726,278—dated Sep. 29, 2015.

* cited by examiner

FIG. 2D

DETERMINING ASSOCIATIONS BETWEEN MEDIA OBJECTS

RELATED APPLICATIONS

This application is a continuation of and claims priority to U.S. non-provisional application Ser. No. 12/137,265, filed Jun. 11, 2008, which application is incorporated herein by reference in its entirety.

FIELD OF INVENTION

The present invention relates generally to a system and process for generating interrelationships among people, their works, and other factors to make useful and interesting connections. More specifically, the invention relates to an interactive internet-based tool that generates interrelationships among artists and content (e.g., TV shows, movies, etc.), enabling users to discover interesting connections in the entertainment industry, or connecting users to available and alternative media of interest.

BACKGROUND OF INVENTION

Interest in the entertainment industry extends beyond the actual films or TV shows produced. Fans are also intrigued by the people associated with the films and TV shows, on both a professional and personal level. Indeed, the interconnection among artists, films and TV shows forms the fabric of the entertainment industry. This is evidenced by the many ancillary periodicals and TV shows created to report on the industry. Although such reporting can be intriguing and certainly has an audience, applicants recognize that users may prefer to conduct their own research and discover interconnections based on their own interests.

Furthermore, given the sheer size of the entertainment industry, it is difficult for a user to realize or identify movies and TV shows that might be of interest. Rather, users tend to fall into patterns of viewing films and TV shows that limit their exposure to new content lying outside their viewing patterns. For example, users may watch the same networks or series, not realizing that shows of similar genre are being offered elsewhere. Couple the vastness of the entertainment industry with the new forms of media being introduced, such as, online viewing and video-on-demand (VOD), and managing one's viewing alternatives becomes a significant undertaking.

Therefore, a need exists for a tool that establishes the interrelationships among the people and content of the entertainment industry to enable users to discover intriguing connections between them and to manage their viewing options. The present invention fulfills this need among others.

SUMMARY OF INVENTION

The invention relates to a system and process for using the interrelationships among media content data to form correlations relevant to the user's interest and needs. Specifically, Applicants recognize that people are intrigued by connections among entertainment personalities and their works, and that, as the connections become more complex or attenuated, they often become more intriguing. The present invention exploits this by providing a system that generates interrelationships among people, their works, and tags (keywords or descriptive phrases) of the entertainment industry (or other industry or field for that matter). The system also interacts with the user to determine his or her interests or needs, and then connects the interrelationships with the user's interests/needs to produce a variety of correlations, including compelling connections among content media of interest to the user, recommended programs for the user to watch based on the user's interests, and alternative media related to the user's interests, just to name a few.

In one embodiment, the correlations themselves are synergistically interconnected to expand the user's experience. For example, connections between people, works and tags can be used, in turn, to generate a watch list of recommended works featuring the connected people, works and tags. Conversely, a recommended work can be used to generate compelling connections between it and other media content. Likewise, a list of related media can be generated from a recommended work. This way, the system and process of the present invention draw on the user's interest and curiosity to guide the user through the various interconnections of the entertainment industry, bringing to the user viewing opportunities and interesting facts about people and works that might otherwise have been missed.

Accordingly, one aspect of the invention is a system for generating connections using the interrelationships among people, works and tags in the entertainment industry. In one embodiment, the system comprises: (a) at least one data store comprising media content data relating to people, works, and tags; (b) a relationship generator configured to generate direct relationships among the people, works, and tags; (c) a connection module to generate connections between a primary person, work, or tag to a first set of the people, works, and tags, wherein each person, work or tag of the first set has a direct relationship with the primary person, work or tag; and (d) a display module for causing the display of at least a portion of the first set of the people, works and tags.

In one embodiment, the connector module is configured as a connection generator. Specifically, the connector module is configured to generate one or more secondary connections between the primary person, work or tag and a second set of the people, works, or tags, wherein each person, work or tag of the second set has at least (a) a plurality of direct relationships with the primary person, work, or tag, or (b) a common direct relationship with the primary person, work, or tag.

In another embodiment, the connector module is configured as a recommendation watch list generator for generating a list of recommended content for viewing. Specifically, the connector module is configured to generate the first set such that is contains a watch list of the available works having a direct connection with the primary person, work, or tag, and the display module is configured to effect the display of a time and location for viewing at least a portion of the watch list.

In yet another embodiment, the connector module is configured as an alternative media generator for generating a list of alternative media related to the user's preference. Specifically, the connector module is configured to generate the first set such that it contains a list of alternative media having a direct connection with the primary person, work, or tag.

In still another embodiment, the connector module is configured as a biography generator for generating a biography of a particular person of interest. Specifically, the connector module is configured to generate the first set such that it contains connections to people, works and tags having a direct connection, and possibly a secondary connection, with a primary person selected by the user.

Another aspect of the invention is a graphical user interface (GUI) associated with the system described above. In one embodiment, the GUI is configured to perform the following steps: (a) generate a display representing the at least a portion of the connections generated between a primary person, work or tag and a data store of people, works, and tags, wherein the display includes a plurality of objects, each object corresponding to a connection, wherein a primary object corresponds to the primary person, work or tag and is displayed with one or more enhanced features relative to the other objects; and (b) embellish one of the other objects with one or more enhanced features when the user indicates an interest in it.

Another aspect of the invention is a process of providing a user with connections at least some of which are based on secondary connections. In one embodiment, the process comprises: (a) generating direct relationships among people, works, and tags from media content data; (b) establishing a primary person, work or tag; (c) connecting a primary person, work or tag to a first set of the people, works, and tags, wherein each person, work or tag of the first set has a direct relationship with the primary person, work or tag; (d) generating one or more secondary connections between the primary person, work or tag and a second set of the people, works, or tags, wherein each person, work or tag of the second set has at least (i) a plurality of direct relationships with the primary person, work, or tag, or (ii) a common direct relationship with the primary person, work, or tag; and (d) causing the display of at least a portion of the first and second sets.

Yet another aspect of the invention is a process of providing a user with a recommended viewing list based on generated connections. In one embodiment, the process comprises: (a) generating direct relationships among people, works, and tags from media content data; (b) establishing a primary person, work or tag; (c) connecting the primary person, work or tag to available works directly related to the primary person, work, or tag; and (d) causing the display of a recommendation for viewing the available works.

Still another aspect of the invention is a process of providing a user with alternative media related to work of interest. In one embodiment, the process comprises: (a) establishing a primary person, work, or tag; (b) connecting the primary person, work, or tag to alternative media directly related to the primary person, work, or tag; and (c) causing the display of a list of the alternative media.

Yet another aspect of the invention is a process for generating a biography on a particular person based on the relationships generated by the connector. In one embodiment, the process comprises: (a) establishing a primary person; (b) connecting the primary person to people, tags, and works having direct relationships; (c) prioritizing connections to limit their number; (d) generating and causing the display of one or more sentences explaining the direct relationship associated with the limited number of connections.

Still yet another aspect of the invention is graphical user interface for interacting with the system to perform the various processes above. In one embodiment, the process comprises: (a) generating connections between a primary person, work or tag and people, works and tags; (b) causing the display of the connections, wherein the display includes a plurality of objects, each object corresponding to a connection including a primary object corresponding to the primary person, work or tag, the primary object being displayed with one or more enhanced features partially covering the other objects; and (c) embellishing one of the other objects with one or more enhanced features when the user indicates an interest in it.

Still other aspects of the invention will be apparent to those of skill in art in light of the following detailed description.

BRIEF DESCRIPTION OF DRAWINGS

FIGS. 2*a-e* show displays generated by the graphical user interface of the system of FIG. 1.

DESCRIPTION OF EMBODIMENTS OF INVENTION

Figure 1:
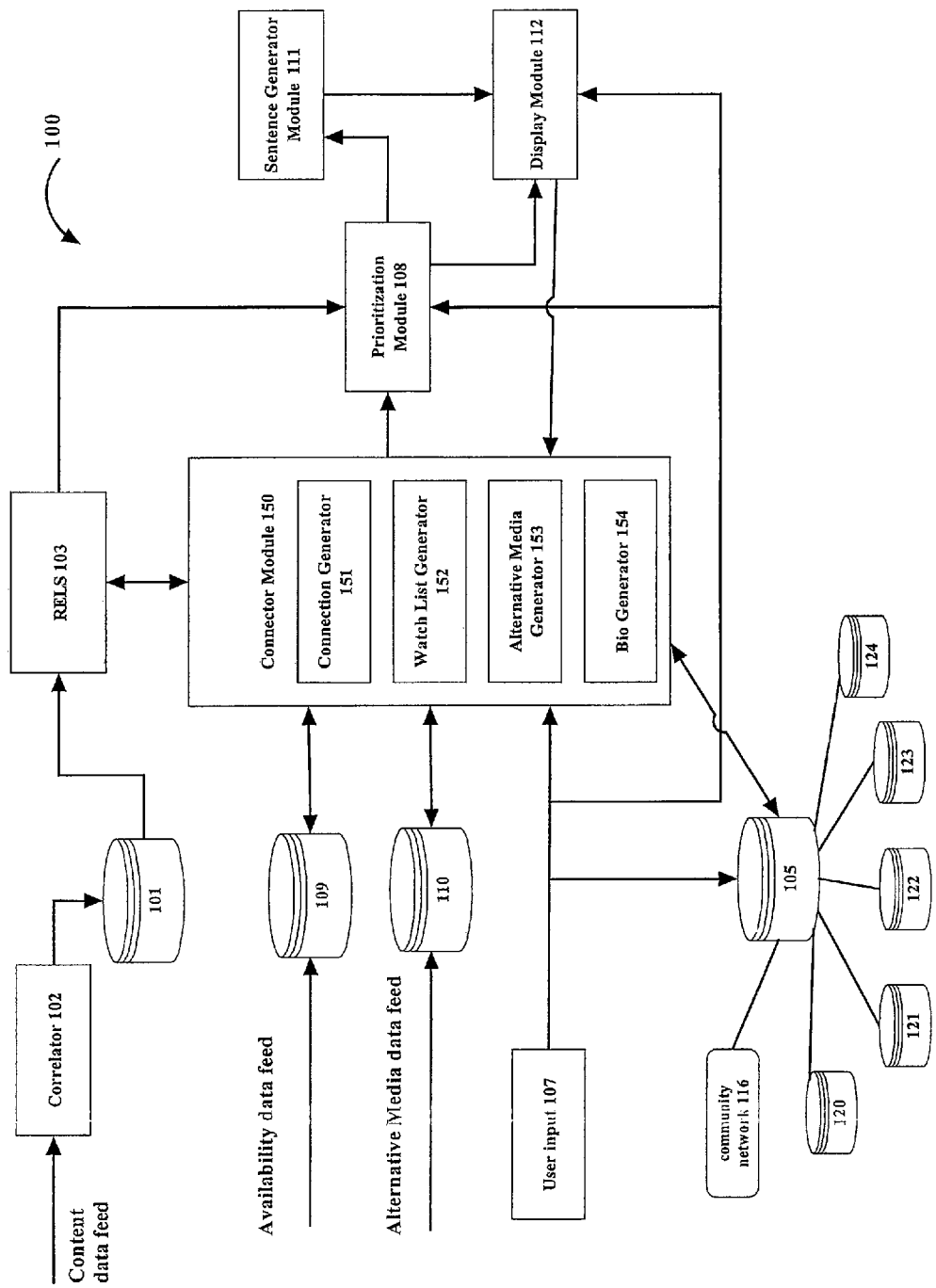
FIG. 1 shows a schematic diagram of the system of the present invention.

Referring to FIG. 1, a schematic of the system 100 of an embodiment of the invention is shown. The system 100 correlates a user's interests to media content to generate interesting and useful connections. In this regard, throughout this application, the interconnections among people, works and tags are described in terms of different relationships. A "direct relationship" is an immediate connection based on a single interaction. For example, "Clint Eastwood starred in The Unforgiven", "Clint Eastwood directed The Unforgiven", and "Tom Cruise and Nicole Kidman were married" are direct relationships. These are the basic building blocks of the other relationships. Two entities have a "first degree connection" or "primary connection" if they have at least one direct relationship. Two entities have an "$n^{th}$ degree connection" or "derivative connection" if they have at least one $(n-1)^{th}$ degree connections with a common entity. For example, George Clooney and Brad Pitt have a second degree (n=2) connection because they both have a first degree (i.e., n−1=1) connection with the movie Ocean's Eleven (via the direct relationship of starring in it). Two entities have a "compound connection" if they have multiple connections of degree n or less. For example, Tom Cruise and Nicole Kidman have a second degree compound connection because they have both a first degree connection (being married) and a second degree connection (both starred in Eyes Wide Shut). Clint Eastwood has a first degree compound connection to The Unforgiven because he both directed and starred in it. The term "secondary connection" refers collectively to derivative connections and compound connections. The term "connection" refers collectively to first degree connections and/or secondary connections.

Referring back to FIG. 1, the system 100 comprises at least one data store 101, comprising media content data relating to people, works, and tags. Linked to the data store 101 is a relationship generator (or RELS) 103 configured to generate direct relationships among the people, works, and tags. RELS 103 is linked to a connector module 150, which may be configured in a variety of ways, but usually connects a primary person, work, or tag to a first set of the people, works, and tags, wherein each person, work or tag of the first set has a direct relationship with the primary person, work or tag. The system 100 may also comprise a display generation module for causing the display of at least a portion of the first set of the people, works and tags. As mentioned above, the connector module 150 may be configured in different ways to use the relationships generated by RELS 103. For example, it may be configured as a connection generator 151, a watch list generator 152, an alternative media generator 153, or a biography generator 154, just to name a few.

These different embodiments and the components of the system 100 are discussed in detail with respect to the schematic of FIG. 1. It should be understood, however, that this schematic is provided for illustrative purposes only, and the system and process of the present invention may be practiced in ways not specifically shown in FIG. 1. For example, the data stores disclosed may be further distributed among multiple storage devices, or they may be consolidated in fewer storage devices. Likewise, although certain programs are depicted as single modules, this is done for illustrative purposes and the programming may be distributed among multiple modules or consolidated in just one. Furthermore, the application modules may be integrated with other application modules and need not be discrete. For example, the connection module may be integrated with the prioritization module. Additionally, it should be understood that the various components shown in FIG. 1 are not necessarily housed in a common area or even operated by a common entity. That is, the various data stores and modules may be operated by different companies and interfaced together by the operation of the system 100. For example, the data stores and community network information may be maintained by one party and interfaced with the system 100 by yet another party. Therefore, the schematic of system 100 should not be used to limit the structure of the system more narrowly than the claims.

Likewise, it should also be understood that, although the system is described in terms of the entertainment industry, it could be applied to other industries/fields/businesses. For example, it may be used by community links to generate compelling connections among its members, or by job placement or marketing companies to derive contacts for making introductions. Considering a community link in more detail, because these networks typical obtain data related to a person, including family, education and employment, a matrix of interrelationships can be established for these categories and compelling connections made to introduce people having, for example, common friends, former employers, hobbies, alma mater, etc. As with the entertainment industry, the intrigue tends to increase as the connection becomes less obvious.

In one embodiment, the system 100 operator may heavily encourage the creating and growth of online groups of like minded people. The groups will be centered around entertainment likes and dislikes. For instance, the group of users who like Tom Cruise, the group of people who despise Paris Hilton or the group of Trekies who like to debate which Star Trek version was better. Groups may be made up of users who themselves have set up profiles, favorites, blogs, have reviewed and rated content, and generally interacted with the system. The system, in turn, captures this data about this user. A group collects the known information about the group of users as a whole, that then allows both the system and users to see aggregate data facts and figures, as well as allowing the system and the members of the group to message and communicate with the group as a whole. Each group may have their own section, with specific users deemed leaders of the group.

Once groups have been established, the system operator may facilitate contests and games between groups, trying to elicit the maximum entertainment value by displaying the contest for all users to see. For example, a live sci-fi trivia contest may be set up between the Star Wars Fans Group and the Indiana Jones Fan Group with the winners able to chat online with George Lucas.

Data Stores

Referring to FIG. 1, the system of the present invention is supplied with media content data from a first data store 101. The media content data relates to people, works and tags. As used herein, people refer to artists (e.g. actors, writers, and directors) and other people (e.g., producers, stage hands, and agents) associated with the conception, production, marketing, financing, and distribution of media works (or simply "works"). The term "works" refers to entertainment and educational media, and includes, for example, films, TV shows, books, scripts, screen plays, sound recordings, and theater productions. "Tags" are well known in the entertainment industry, and refer to descriptive data in the form of keywords ascribed to works by third party providers (e.g., the Internet Movie Data store (IMDB)) or by individuals. Common tags include ratings (G, PG, R, etc.), genre (comedy, suspense, action, etc), actor's names and roles (e.g. lead, supporting, cameo), scenes (nudity, car chase, fight, etc), and other descriptive phrases (character name in title, famous theme song, etc).

Data store 101 receives the data through a plurality of feeds commercially available through paid providers such as, for example, the Internet Movie Data store (IMDB). To be useful, the data is organized into given fields. These fields may include, for example, actor name, actor birthdate, movie title, movie release date, etc. It is unlikely, however, that the different fields will have the data organized in the same fields or even provide the data in the same format. Therefore, in one embodiment, the system 100 comprises a correlator 102 to correlate different field protocols from different feeds. In one embodiment, the correlator is a table for interrelating the different fields.

In addition to the first data store, the system 100 may comprise an available works data store 109. This data store provides information on the availability of works. For example, it may provide information on (a) when a certain TV show is playing and on what channel, (b) when a program is available for online viewing, (c) when a film is being released on DVD, (d) when and where a film is being shown, (e) when a film or TV show is available for VOD viewing, (f) when or where a film or TV show may be purchased or rented. This information may be a compilation of one or more known feeds, such as TMS. In FIG. 1, this data store is discrete although it may be integrated with the first data store, as mentioned above. In this respect, work availability may be a type of data related to works, as mentioned above with respect to the first data store. Alternatively, rather than a data store, this information may be available from a data feed.

Related to available works data is the alternative media data. As used herein, the term "alternative media data", or simply "alternative media", refers to an index, listing or identification of (a) the different methods of delivering/receiving/accessing a given work, such as, for example, online, on-demand, unicast, multicast, broadcast, basic cable, premium cable, network TV, theater production, Netflix, Amazon, Blockbuster, etc, or (b) the different formats of the given work, such as, for example, VHS, DVD, high definition digital, wide screen, color, 3-D, MP3, MPEG, etc. In one embodiment, the alternative media data includes information on the availability of the alternative media, and, in this regard, may be integrated with the available works data described above. Knowing the various forms of media or methods of accessing the content is important as it allows the connector to "translate" the work from one media to the user's preferred media described above. As with available works, this data may be included with the people, works, and tags data store described above, it may be a discrete data store 110, or it may be a data feed.

Another source of data is from the user profile data store 105. Data for this data store may be acquired in different ways. For example, it may be obtained directly from the user through the user input 107 in response to questions generated by the system 100 and stored in a preferences data store 121. More specifically, the system 100 may query the user on preferences such as favorite movies, TV shows, actors, genres, preferred viewing times and frequencies, etc. It may also ask for personal information such as age or sex to identify stereotypical viewing tendencies, and request information on location (e.g. ZIP code), type of service (cable, satellite, etc), and service provider to determine availability of viewing options. The queries may also ask for dislikes to avoid them in making connections.

The system may also ask the user to rate movies and programs to determine viewing preferences. In this regard, the system may work in a number of ways. For example, the system allows words rather than numbers to represent ratings (e.g., awesome might be used instead of 5 stars), and that these words can be customized depending on the content type and genre of the item(s) being rated (e.g., horror movies might be "I screamed my head off" instead of awesome).

Other data that may be obtained directly from the user includes media preferences. That is, with entertainment media available in so many different forms (e.g., online viewing, VOD, broadcasts, DVD, VHS, MP3, movie theater, etc.), knowing which media the user prefers provides valuable information on how the content should be delivered.

In addition to obtaining information by directly querying the user, the system 100 may obtain information indirectly by observing and monitoring the user's behavior. For example, the user profile may be obtained by monitoring the user's input 107 so that, if the user requests information about an actor or film, for example, this request is recorded in a request data store 120 and becomes part of the user's profile 105. Another example of indirect data gathering is by monitoring the user's online behavior. Specifically, the user profile 105 may be inferred by cookies or other online behavior and stored in an online data store 122.

Another valuable source of user data is the user's digital video recorder (DVR) 124. A DVR is a device that records video in a digital format to a disk drive or other medium. The term includes stand-alone set-top boxes and software for personal computers that enable video capture and playback to and from disk. The term also includes televisions with DVR hardware and software built in to the television itself. By their nature, DVRs store and organize a user's viewing preferences. Specifically, DVRs use the metadata provided in programs recorded or scheduled for recording to provide informative lists of programs available for viewing. Because the user must select the programs to be recorded, only programs of interest to the user are listed. Furthermore, more advanced DVRs allow the list to be customized according to a user's needs. For example, it may prioritize programs on the list according to those that remain unwatched, and, likewise, deemphasize or even delete those that have already been watched. Essentially, the DVR functions to list programs of particular interest to a user in a meaningful and helpful way. Accordingly, they provide a valuable source of information on a user's profile.

Another indirect data source for the system 100 is a community link 116. Recently, community networks such as Linked In and Facebook have gained in popularity. Through these community networks, people voluntarily associate themselves with others based on business relationships, schools, friendships, etc. The system 100 may interface with these community links 116, not only to obtain information on a particular user, but also to engage different groups of people with online competitions and challenges related to the entertainment industry. For example, the system 100 may pit a Star Wars group against a Star Trek group in a trivia competition on space movies.

Although system 100 is depicted with a user profile data store 105 that comprises a number of other data stores, other sources of data exist and include, for example, paid lists. Still other sources of personal information are available and are becoming more accessible as the internet continues to proliferate.

RELS 103

In one embodiment, RELS 103 is at the heart of system 100, linking the various data stores with the connection module 150 and its various generator embodiments. RELS 103 functions to form relationships among the people, works and tags of the media content data. Specifically, in one embodiment, RELS 103 generates direct relationships among people, works and tags. A direct relationship refers to a primary person, work or tag having a direct association with another person, work, or tag, with no intervening people, works or tags required to connect them. For example, one actor may be directly related to a film because he starred in the same film, or one actor may be directly related to another actor because they dated each other. In a more qualitative sense, as discussed below, a direct relation exists between a primary person work or tag and a connected person, work or tag, when one or more data fields of the primary person, work or tag contains the connected person, work or tag. These direct relationships provide for a variety of different outputs, including, for example (1) secondary connections, (2) viewing recommendations, (3) alternative media, and (4) biographies as mentioned above and discussed in detail below.

Before considering the uses for the direct relationships, the generation of the direct relationships in RELS 103 will be considered in greater detail. In one embodiment, the direct relationships are independent of the user's profile, but rather depend on the extent of the media content data. As the volume of data for people, works and tags in this data store increases so does the number of direct relationships.

In one embodiment, the direct relationships are built in accordance with a matrix of people, works, and tags versus people, works and tags. For example, referring to Table 1, a matrix of people, films, TV shows and tags is shown. Noteworthy is the fact that works have been split into films and TV shows. Applicants have found that these two categories (films and TV shows) are sufficiently distinct and independent in the entertainment industry to be split apart. It should be understood, however, that this division is discretionary, and, for that matter, the other categories could be split or combined as well. For example, the people category may be split into artists, directors, producers, agents, crew, etc. It should be clear that as the number of categories in the matrix increases, so does the volume of interrelationship data fields (mentioned below). Therefore, the choice of categories will tend to be an optimization of connection permutation complexity versus compelling/unique connections. Furthermore, it should be understood that the matrix illustrated below is for illustrative purposes, providing structure and a guide to the various interrelationships among people, works, and tags in the entertainment industry; however, the actual program required to practice the present invention may or may not use such a matrix.

TABLE 1

|  | People | Movies | TV | Tags |
| --- | --- | --- | --- | --- |
| People | Romantic/personal relationships participated in common movies/TV programs | Participated Roles Stared/costarred/cameo | Participated Roles Stared/costarred/cameos | Characteristics of programs person is in or keywords ascribed to a movie editorially or by users |
| Movies | Participated Roles Stared/costarred/cameo | Remakes Sequels | Remakes Sequels Pilots | Keywords ascribed to a movie editorially or by users |
| TV | Participated Roles Stared/costarred/cameo | Remakes Sequels | Remakes Sequels Pilots | Keywords ascribed to a movie editorially or by users |
| Tags | Characteristics of programs person is in or keywords ascribed to a movie editorially or by users | Keywords ascribed to a movie editorially or by users | Keywords ascribed to a movie editorially or by users | Notions that are similar. E.g. Car chase is associated with bike chase. |

Referring back to Table 1, the interrelationships among people, films, TV shows and tags are described and designated as interrelationship fields or just data fields. For example, the interrelationship fields for the intersection of people/people are: (1) Romantic/personal relationships and (2) participated in common movies/TV programs. Other interrelationships can be readily identified in the table, and still others can be established (e.g., people/people relationships may include children, classmates, best friends, etc.). There are no first degree connections between two tags, for example, and most movies do not have first degree connections to other movies or TV shows (sequels and adaptations being the main exceptions). Similarly, most people-to-people connections are actually 2nd degree connections through a common movie or TV show.

For illustrative purposes, the various interrelationship fields are populated in Tables 2-5 with data corresponding to actual people, movies, TV shows, and tags, respectively. Specifically, the person considered is Tom Cruise, the movie is War of the Worlds, the TV show is Alias, and the tag is Adventure.

TABLE 2

Person Interrelationship Fields for Tom Cruise

|  | People | Movies | TV | Tags |
| --- | --- | --- | --- | --- |
| People | Tom Cruise is married to Katie Holmes. Tom Cruise starred with Nicole | Tom Cruise starred in Top Gun. Tom Cruise starred in Mission: Impossible. | Tom Cruise directed Fallen Angels. | Tom Cruise has been tagged with "consciousness-raising". Tom Cruise has been tagged with |

TABLE 2-continued

Person Interrelationship Fields for Tom Cruise

| People | Movies | TV | Tags |
| --- | --- | --- | --- |
| Kidman in Eyes Wide Shut. |  |  | "boxer shorts." |

TABLE 3

Movie Interrelationship Fields for War of the Worlds

|  | People | Movies | TV | Tags |
| --- | --- | --- | --- | --- |
| Movies | War of the Worlds was directed by Steven Spielberg. War of the Worlds stars Tom Cruise. | War of the Worlds (2005) is a remake of The War of the Worlds (1953). War of the Worlds and Jurassic Park were both directed by Steven Spielberg. | War of the Worlds and Alias both featured Art Chudabala and Travis Aaron. | Adventure, Tense, Adaptation |

TABLE 4

TV Show Interrelationship Fields for Alias

| | People | Movies | TV | Tags |
|---|---|---|---|---|
| TV | Alias was written and directed by J. J. Adams Alias stars Jennifer Garner. | Alias stars Rutger Hauer who also starred in Blade Runner. Both movies feature the "Technology" and "Sci-Fi Action" tags. | Alias stars Al Sapienza and Katherine Disque who were also featured in The O.C. | Adventure, Sci-Fi, TV series |

TABLE 5

Tag Interrelationship Fields for "Adventure"

| | People | Movies | TV | Tags |
|---|---|---|---|---|
| Tags | John Ehrhard, Fred Wright, | Gladiator, Lawrence of Arabia | Lost, Dr. Who | Notions that are similar. E.g. Car chase is associated |

RELS 103 therefore uses the media content data from the first data store 101 to generate a vast number of direct relationships among people, works (i.e., movies and TV), and tags. As mentioned above, these direct relationships, in turn, provide for a number of different outputs, including compelling connections, viewing recommendations, alternative media and biography generation using the connection module 150.

Connection Module 150

The connector module 150 may be configured in different ways to use the relationships generated by RELS 103 for different purposes. For example, it may be configured as a connection generator 151, a watch list generator 152, an alternative media generator 153, or a biography generator 154, just to name a few. These various embodiments are considered in detail below.

Connection Generator 151

In a basic embodiment, the connection generator 151 is configured to connect a primary person, work or tag to a first set of the people, works, and tags, wherein each person, work or tag of the first set has a direct relationship with the primary person, work or tag. The connection generator may also be configured to generate one or more secondary connections between the primary person, work or tag and a second set of the people, works, or tags.

Watch List Generator 152

The connector module may also be configured to include a watch list generator 152 to generate a recommended watch list. In one embodiment, the people, works and tags data (particularly the works data) includes available works data, which relates to information on the availability of works as described above. This data may be part of the people, works and tags data store 101, a discrete data store 109, or a data feed. Like the connection generator, the watch list generator functions to connect a primary person, work or tag to a first set of the people, works, and tags, wherein each person, work or tag of the first set has a direct relationship with the primary person, work or tag. Here, however, the first set is a watch list and comprises the available works having a direct or secondary connection with the primary person, work, or tag.

In one embodiment, the watch list generator 152 is used in conjunction with the connection generator 151 described above to provide provocative recommendations. For example, as mentioned above, the connector module may be configured to generate one or more secondary connections between the primary person, work or tag and a second set of the people, works, or tags, as described above. In this embodiment, the watch list generator 152 is configured to add the available works having a direct relationship to a person, work or tag from the second set to the watch list. Therefore, the available work may be directly related to the selected person, work or tag or it may be derivatively related. For example, if the user has an interest in racing, it may recommend a time and a place (e.g., channel) to watch Days of Thunder which is directly related to racing, or it may recommend a time and a place to watch Top Gun, which is derivatively related to racing through Tom Cruise, who also starred in Days of Thunder.

Once the watch list is generated, at least a portion of it may be displayed along with a time and location for viewing at least a portion of the watch list. In this context, location refers to a channel or website if the work is available electronically, or street address if the work is being shown or otherwise displayed in a theater or other physical location. Alternatively, the system 100 may receive time/day information corresponding to the desired time to watch a movie or program from user input 107, and the watch list generator 152 would recommend a selection of works related to the user profile or user request that are available at the desired time. Displaying the list may also be performed by sending a message to users through email, IM, SMS and other communication systems. The system may also be configured such that displaying is performed by automatically setting a user's DVR and other recorders to record the available content on TV. The user is also able to set up, subscribe to and publish out schedules based on this list, using them in RSS readers, widgets, on websites and other media.

Although the watch list generator 152 may be used in conjunction with RELS 103 to provide connections to movies and TV shows based on both direct and derivative connections, as described above, in one embodiment of the system 100, RELS 103 is not used. Rather the watch list generator 152 receives the user's selection of desired movies or TV shows, receives the user's desired viewing time, and determines which movies and TV shows are available at the desired time from the available works data store 109.

Alternative Media Generator 153

In one embodiment, the system 100 of the present invention is configured to provide information on media related to a user selection using an alternative media generator 153. Specifically, system 100 serves to correlate a given movie or TV show with an alternative media data store 110 containing an index or listing of alternative media for various TV and movies—e.g., online viewing, DVD, VHS, VOD, broadcast, pay per view and other multicast applications. The user enters his or her selection (i.e., establishes a primary person, work or tag), along with preferences for media (which may be stored in data store 123). Like the watch list generator 152, the alternative media generator 153 is configured, in one embodiment, to connect the primary person, work or tag to alternative works in the data store 110 having a direct relationship with the primary people, works, or tags. Unlike the watch list generator 152 which correlates this work to available works, the alternative media generator 153 correlates this work to the alternative media data stored in data store 110 and to the user's desired media in data store 123.

Alternatively, the user's selection may be used directly by the alternative media generator 153. Specifically, the alternative media generator 153 may be configured to use a selection of movies or TV shows form the user, or generated by the connector, along with the preferred media form data store 123 and the alternative media in data store 110 to generate a list of movie and TV shows available on the user's preferred media.

Biography Generator 154

Although media content data contains biographies of popular artists, often no biography exists for more recent or less popular artists. In such a case, the connector module 150 may be configured as a biography generator 154 to generate a biography on the particular artist. Specifically, the biography generator 154 is configured to connect the primary person to a first set of the people, works, and tags, wherein each person, work or tag of the first set has a direct relationship with the primary person, work or tag. The biography generator 154 may also be configured to generate one or more secondary connections between the primary person, work or tag and a second set of the people, works, or tags. In this way, it functions like the connection generator 151, but instead of forming connections with a primary person, work or tag, it is only generating connections based on a primary person. Furthermore, in one embodiment, direct connections and secondary connections involving only multiple direct connections (as opposed to derivative connections) are emphasized. By concentrating on the direct relationships with the particular artist, connections between that artist and other people works and tags tend to be more relevant and appropriate for a biography.

Although the connector module 150 is described above with respect to several different embodiments, it should be understood that this description is not intended to be exhaustive and still other embodiments exist. For example, the connector module 150 may be configured to generate biographical/historical information for a particular movie, or to connect all the people who have ever dated a certain person. Indeed, the information generated by RELS 103 provides for many possibilities.

Prioritization Module 108

RELS 103 can be used to generate an essentially infinite number of connections depending upon the number of direct relationships available and the degree of attenuation allowed. In other words, if the pool of direct relationship provided by RELS 103 is relatively deep, then the number of $2^{nd}$ degree and higher connections increases exponentially. In this respect every person, work or tag may be connected to every other person, work or tag if the derivative connection has a high enough degree. Therefore, before outputting the connections, the connections are prioritized in module 108 using a combination of one or more approaches.

For example, they may be prioritized based on available programming provided in data store 109. As mentioned above, data store 109 may be interfaced with the programming of the cable network, allowing the prioritization module 108 to determine when certain movies and TV programs associated with certain artists will be available. The availability of these movies and programs therefore is used to prioritize certain connections. That is, a connection to a person, work or tag is considered a higher priority if a work associated with that person, work or tag is more readily available for viewing than a work associated with a different connection. For example, if Actor A stars in Movies X and Y, and Movie X is available for online viewing, while Movie Y is not, the connection between Actor A and Movie X will have a higher priority over the connection between Actor A and Movie Y. In a more complex example, if Actor A is connected to Actor B who stars in Movie X and Actor C who starts in Movie Y, and Movie X is available for online viewing, while Movie Y is not, the connection between Actor A and Actor B will have a higher priority over the connection between Actor A and Actor C.

As an alternative to prioritizing based on content availability, the priority of the connections may be based on user profile 104 or input 107, which indicates which people, works, or tags are of particular interest to the user. Connections involving people, works and tags having a particular appeal to a user are given a higher priority. Likewise, the user profile may contain dislikes of people, works and tags to minimize their priority in connections. Furthermore, the user may specify a certain preference for a type of connection, such as, for example, romantic connections or connections between just people, or, even more specific, romantic connections between people. For example, if a user preferred connections based on romantic interrelationships, such connections would be pushed up in priority.

The user request may also be in response to initial connections. That is, once a group of connections is displayed, the user can readily choose which connections are more interesting, and then the connection module may develop those connections further. For example, if a connection between actor A and B is displayed, the user may select one of the two actors for additional connections. In this way, the user travels along a path of compelling connections (described below in detail).

Yet another prioritization approach involves weighting people, works or tags according to their influence, popularity, or profitability. For example, the weight of a person may be considered proportional to the number of his or her direct interrelationships with other people, works, or tags. In this respect, the interrelationships generated by RELS 103 allows for the people, works, and tags of the first data store to be prioritized. For example, Kevin Bacon may be weighted more heavily than Olivia Newton-John because he has more direct interrelationships with other people, movies and tags than the popular singer. Accordingly, connections involving Kevin Bacon would have a priority over those with Olivia Newton-John.

Similar to weighting, another prioritization technique is based on the number of relationships one connection has with the primary person, work or tag. With respect to secondary connections, and in particular, nth-degree connections, lower degree connections are more closely related, while high degree connections provide for more compelling (less obvious) results. Thus, there is a preference for higher degree connections. However, when the order of the connections gets too high, the relationships become less meaningful. For example, applicants have found that every person in Hollywood is connected to every other person in Hollywood with a $12^{th}$ degree connection or less. It has also been found that compound connections are more interesting than non-compound ones. That is, connections involving multiple direct or derivative connections tend to be more interesting. For example, the connection that Actors A and B, not only starred in the same movie, but also dated the same person is more interesting than the connection that the actors merely starred in the same movie. Consequently, the priority is given to compound connections of degree 2 or less.

One embodiment of the invention uses not just one of the prioritization approached mentioned above, but a combination of two or more.

The position of prioritization module and the function of prioritizing the connections may occur before or after the connections are made. In the embodiment disclosed in FIG. 1, the prioritization occurs after the connections are made in the connection module. For example, the prioritization occurs after the secondary connections are generated in connection generator 151. Such an approach has the advantage of being comprehensive by virtue of generating essentially all the connection before considering them. Such an approach, however, may be computationally excessive in some case.

Accordingly, another embodiment of the invention provides for prioritization before the connections are generated. In this embodiment, the secondary connections are limited to certain people, work and tags established by the prioritization module as being relevant using the approaches described above. This is performed, for example, by defining both the primary person, work or tag, and the connected people, works, or tags prior to generating the connections. The connection module then functions to derive direct, secondary connections between the two end points. Such an approach may even be a feature of the website. That is, the user may define both a primary person, work or tag and a connected person, work or tag, and the system 100 will provide a connection between the two. Given the power of RELS 103 described above in conjunction with the connection generator 151, it is highly likely that any two people, works, or tags can be connected by a combination of direct and derivative connections.

Even if the number of connections are limited by pre-prioritizing before the connections are generated, a huge number of connections may nevertheless be generated. Accordingly, some prioritization of even pre-prioritized connections is likely necessary. Therefore, in one embodiment, the system and process of the present invention use a combination of prioritization before and after the connection module.

Sentence Generator Module

In one embodiment, once the output is prioritized, it is forwarded to a sentence generator module 113 which is able to output the connections in a simple sentence. This is important, especially as the complexity of the connection increases. Simply stating that two people, works, or tags are connected without explaining the relationship behind the connection may not be interesting, and, if the relationship is particularly attenuated, the connection may not even be understandable. Rather, it is preferable to provide a description of the relationship behind the connection. To this end, the sentence generator 113 is configured to connect two or more people, works or tags with a phrase that explains the direct or derivative connection that establishes the connection. For example, Actor A is related to Actor B because they started in three movies together.

With respect to the watch list generator, the idea of the real sentence recommender is to replicate the human interaction of one person recommending, for example, a movie to another person. Most recommendation systems provide users a list of movies which the user is told either is related because other people who bought/consumed a particular work also liked x, y, and z, but with no explanation provided. System 100, however, preferably recommends a work based on sentences with a more emotional and targeted element. For example, the system may recommend a movie because it has the best car chase ever.

The sentence generator in this embodiment has three key parts: collection of short reviews from users, dissection of those short reviews into technically manageable concepts that can be mapped across content, and presenting back to other users' recommendation sentences based on meta data, other users' reviews or a combination of both.

Users are offered and encouraged to write short reviews (with a character count limit, e.g., 100 characters) that explains why they rated a movie a certain way and how they felt about the movie. A reviewer might enter one idea (e.g., the movie was really funny) or they might enter multiple ideas (e.g., the movie was really funny and there was an awesome car chase scene). The site then parses out that idea(s), and matches the concept of that thought to other similar terms/thoughts across this entity of entertainment as well as others. For example, the description "really funny" might be matched with another review stating that the movie was "hysterical". It also might be matched with a TV show that has been labeled "made me laugh really hard".

The user who entered a review or comment also may have it simplified and mapped to his profile. This way, the system knows he likes reviews that tell him about funny things and things with good car chases. Once these mappings have been made, the system may look through its database for other entities that match the term and automatically make those matchings.

When the system wants to recommend a title to a user, the system may look at the data it has at hand. Depending on the amount of data at hand for that entity, it might create a recommendation sentence that is simply based on metadata (tags) which matches the user profile. For example, if user x has indicated he likes football, the system might recommend a particular movie because it is about football. If better information is available, the system might say that the movie has a great car chase and that another user recommended.

Further, if another user y provided two positive things about a work or person, one which matches the interests of user x and one not matching the profile of the user x, the system may offer as the basis of a recommendation only the matching interest. Obviously when there are many opinions about an entity, the system can amalgamate these into groups (e.g., 47 people said the car chase is the best ever) as well as pick one review which is a best match for the user's profile.

Display Module 112

Once a sentence is generated, this information is provided for display using the display module 112. Typically, this involves providing the results for display on a user's computer monitor or TV screen. It should be understood, however, that providing information for display, in this context, also refers to providing the information for printing, sound generation, or outputting in any meaningful way for the user. For example, providing the information for display to the visually impaired may involve a display module configured as a sound generator for converting the sentences described above to a wave form or other sound producing format for the user. At this point, the user can react to the information provided, and interact with the system to indicate additional preferences at which point the process may be reiterated as discussed above.

Figure 2A:
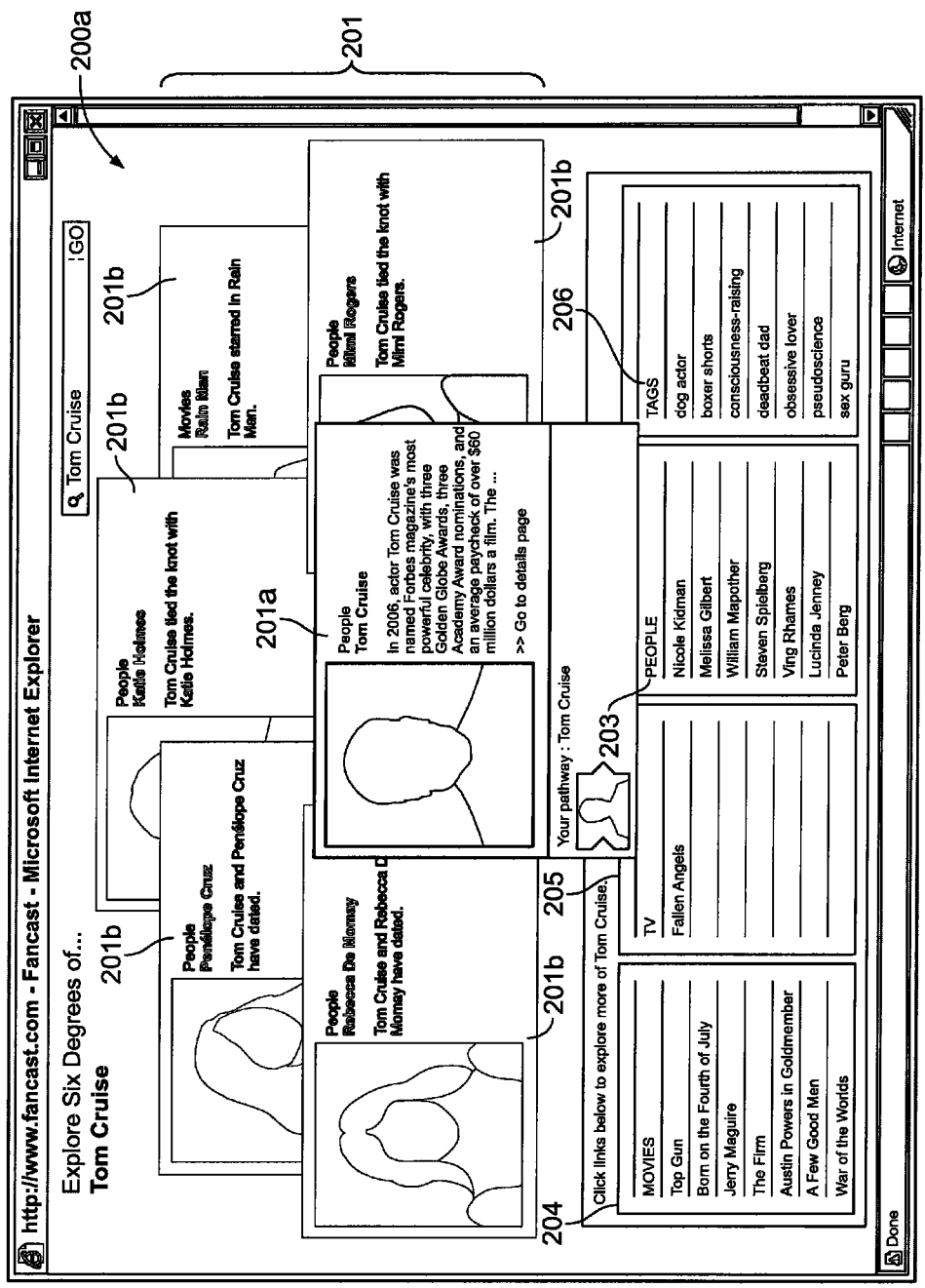

In one embodiment, the display module comprises a graphical user interface (GUI) for causing the display of connections between content data. Referring to FIG. 2a, after connections between a primary person, work or tag and people, works and tags are generated and explanations (i.e., the relationships) are attributed to each of the connections as described above, the GUI is configured to generate a display 200a of a plurality of objects 201, each object corresponding to a connection. For example, in one particular embodiment, referred to as "Six Degrees™", six objects, each corresponding to a connection to a primary person, work (i.e., TV show or movie) or tag are displayed. It should be understood, however, that the number of objects displayed is discretionary.

One of the objects, a primary object 201a, corresponding to the primary person, work or tag is displayed with enhanced features relative to other displayed objects 201b. The enhanced feature(s) may include, for example, additional colors (e.g., the non-enhanced objects may be in grayscale), ordering the enhanced object on top of the other remaining objects (thereby giving the primary object the appearance of being a discrete card or photograph on the top of a pile of cards or photographs), or increasing its brightness (the other objects may have a lower light/color intensity). For example, referring to FIG. 2a, connections generated for Tom Cruise are displayed with the primary object 201a corresponding to Cruise being brighter than the other subdued objects 201b. Additionally, the object 201a corresponding to Cruise is ordered on top of the other objects. Still other techniques for enhancing one object over another will be obvious to one of skill in the art in light of this disclosure.

In one embodiment, the GUI displays images for at least a portion of the objects as shown in FIG. 2a. Specifically, in addition to the name or identification of the person, work or tag and perhaps an explanation of its connection to the primary person, work or tag, the object may comprise an image of the identified connection. For example, referring to FIG. 2a, one of the objects includes an image of Katie Holmes whose connection to Tom Cruise is explained as "Tom Cruise tied the knot with Katie Holmes."

Aside from a relatively few objects 201a, 201b being prominently displayed, such as with explanations and images, other connections may be displayed in a less prominent way such as just lists of connected people 203, movies 204, TV shows 205, and tags 206 as shown in display 200.

Figure 2B:
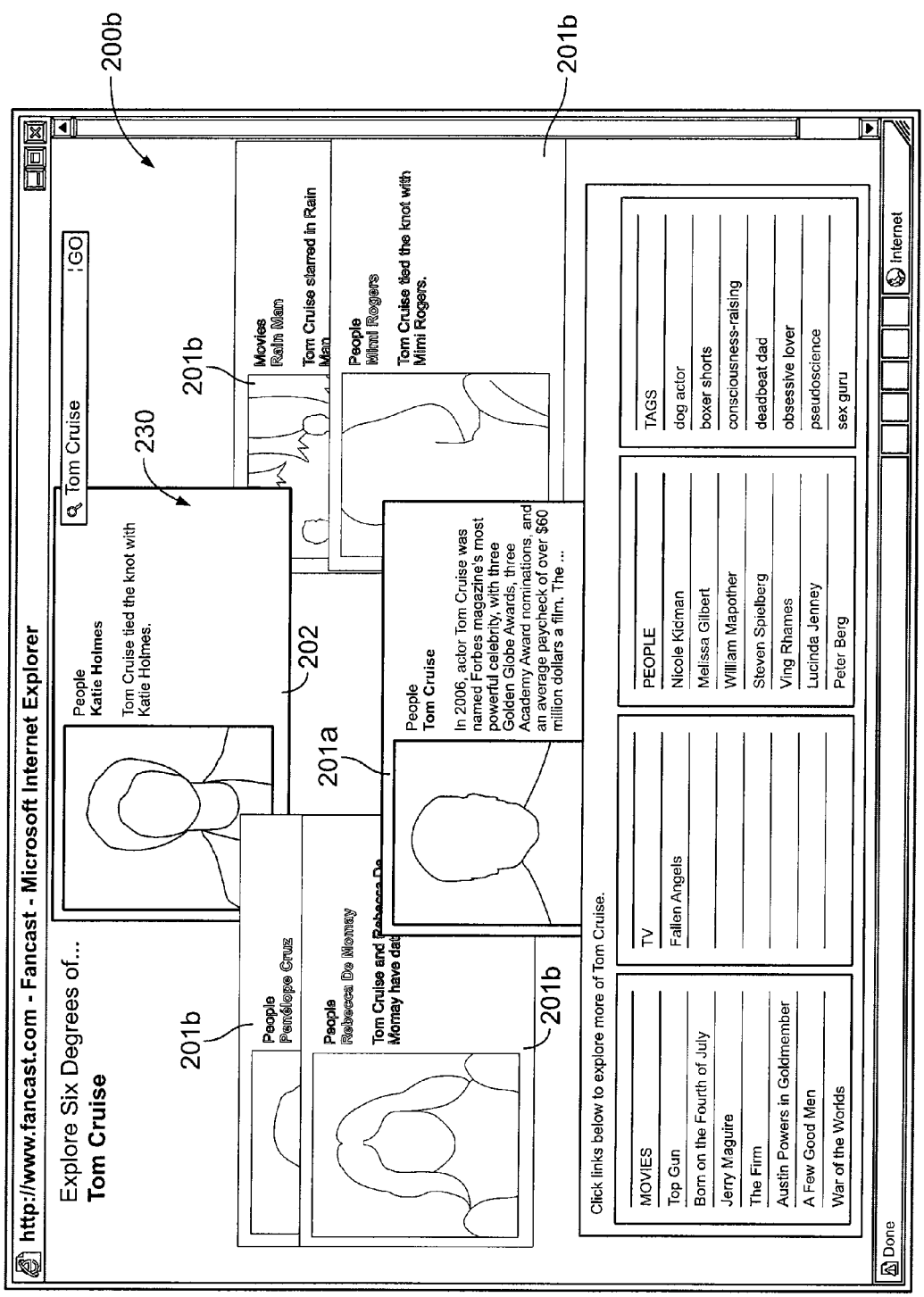
Figure 2C:
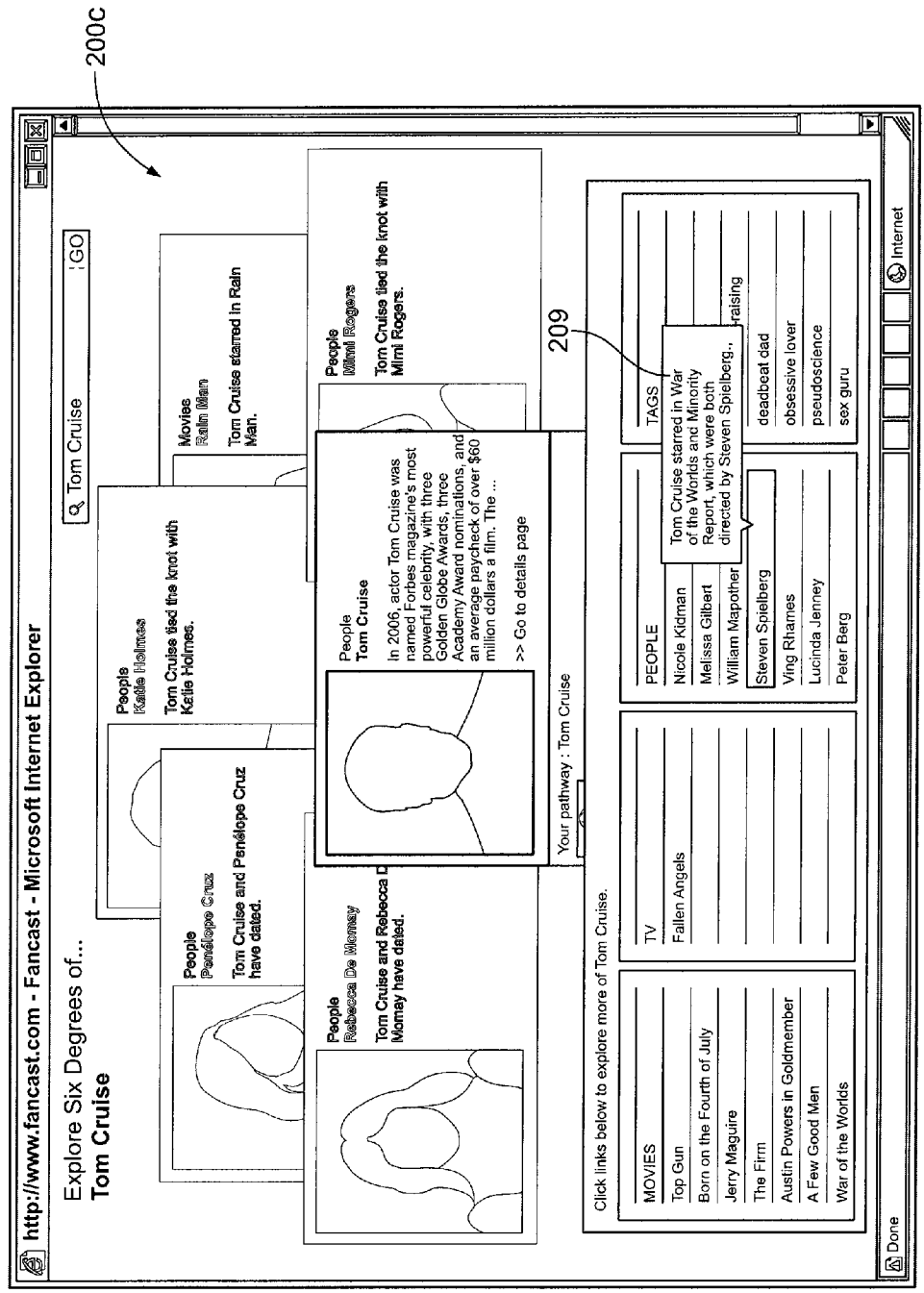

The GUI may be configured to respond to different levels of user interest in an object. At a first level, the GUI is responsive to the users' interest in the object with respect to the primary object. For example, the GUI may enhance an object when the user moves the cursor over the object for a certain period of time or "right-clicks" on the object. This is shown in FIG. 2b. With the cursor 230 over object 202, which corresponding to Katie Holms, object 202 in display 200b is enhanced (in this case brighter) relative to the other objects 201b. Furthermore, in the case of the connected objects that are not prominently displayed—i.e., connected people 203, movies 204, TV shows 205, and tags 206, the GUI may be configured to provide additional information on particular connections when the user indicates an interest in it. For example, if the user moves the cursor over a connected person, e.g., Steven Spielberg, additional information 209, for example, in the form of an explanation of the connection (e.g. "Tom Cruise starred in War of the Worlds and Minority Report, which were both directed by Steve Spielberg") appears on the display 200c as shown in FIG. 2c.

Figure 2D:
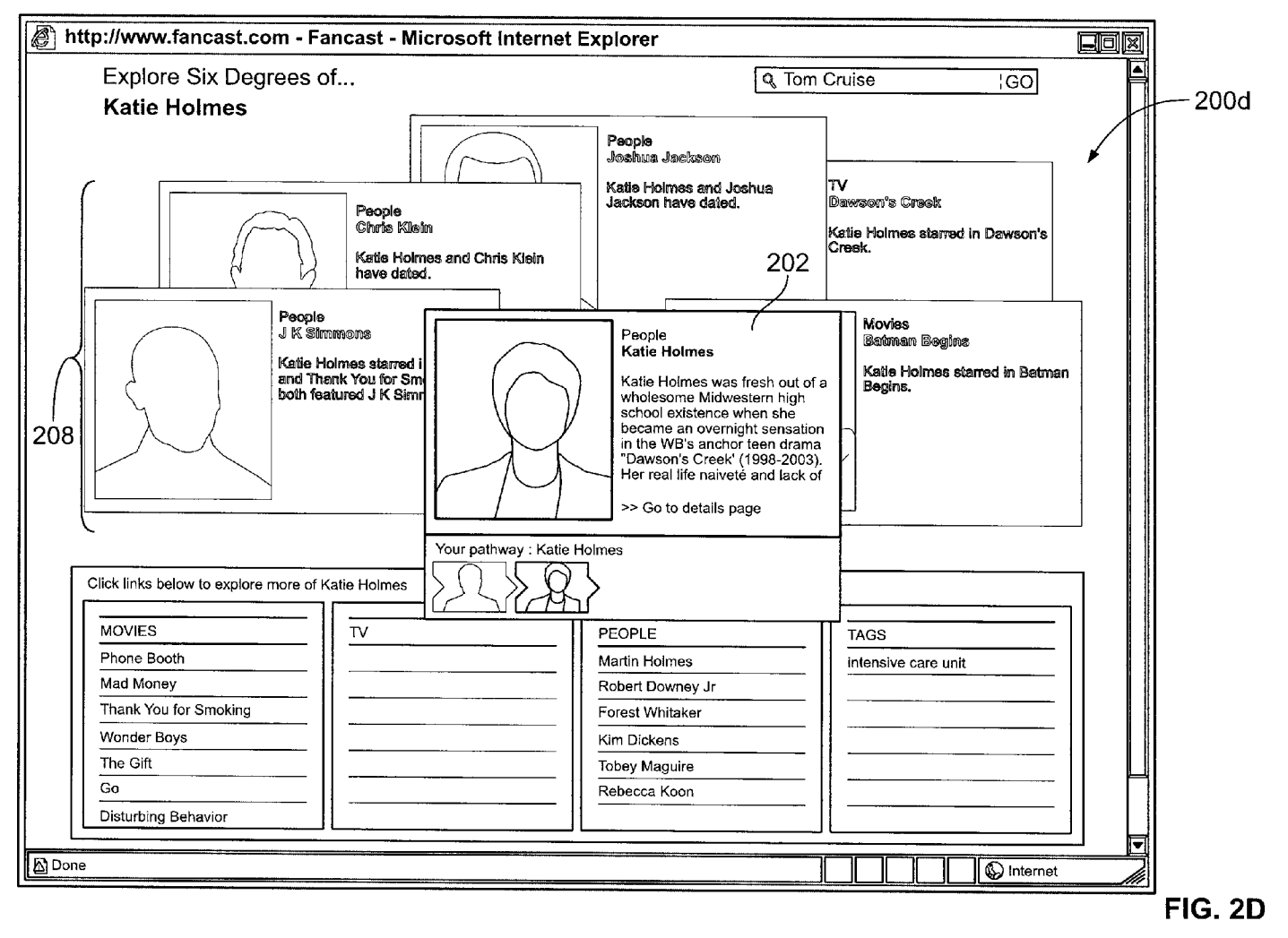

If the user is particularly interested in an object 201b beyond its relationship with the primary object 201a, the GUI may be configured to interact with the user at a second level in which system 100 generates a new set of connections based on the particular object being selected as a new primary object. For example, when the user double clicks on an object of interest, in this case object 202 corresponding to Katie Holmes, the GUI establishes that object as the new primary object in response. The connector module then generates new connections for a primary person corresponding to the new primary object. The GUI then generates a new display 200d of a plurality of objects 208 as shown in FIG. 2d, corresponding to new connections to the new primary person, e.g., Katie Holmes. At this point, the user is able to again indicate a level of interest for the newly displayed objects and the process continues. Therefore, system 100 and its GUI facilitate a process of drilling down and discovering connections based on previously-displayed connections. Such a process has been found to be both informative and entertaining.

Figure 2E:
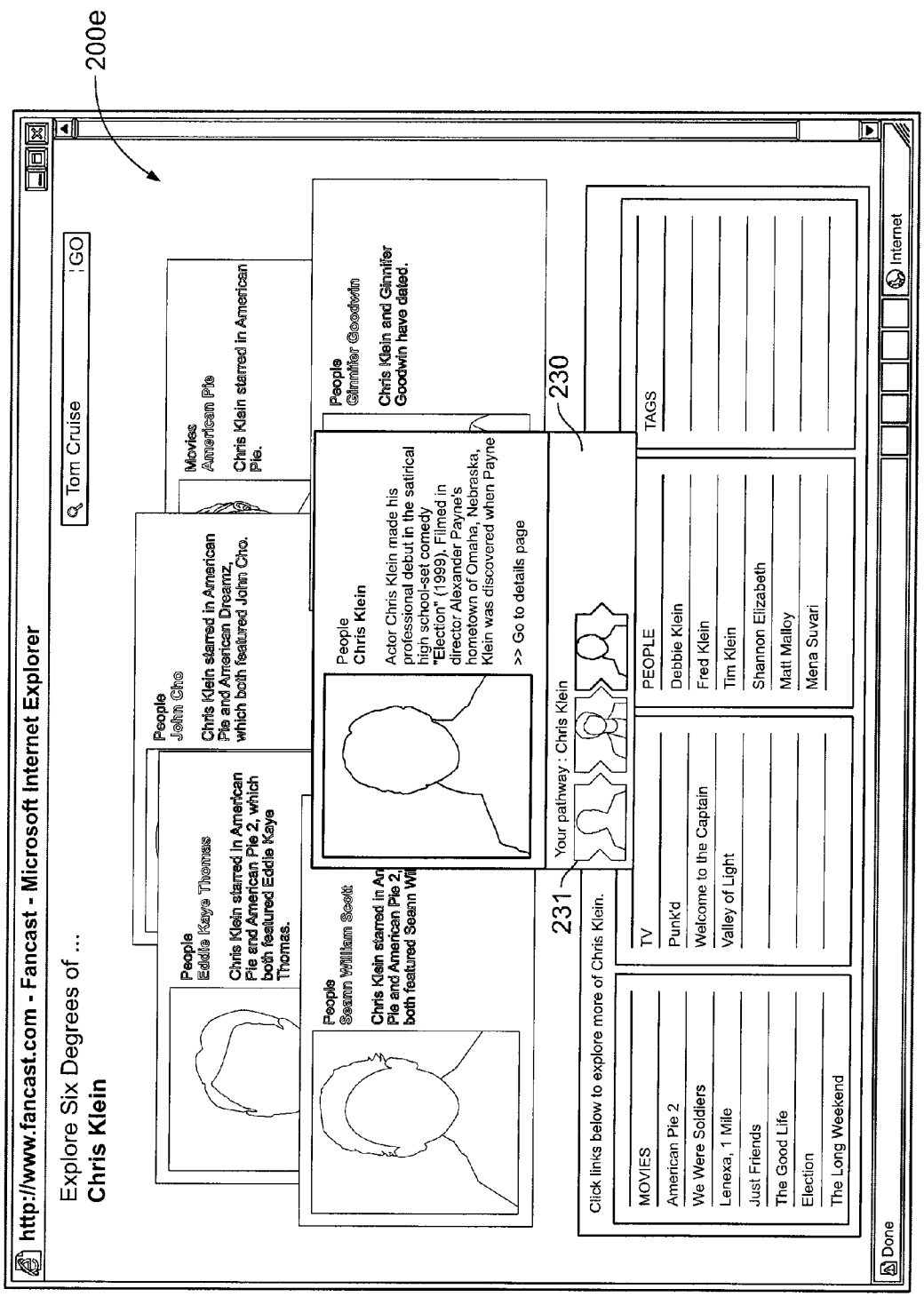

Because the system 100 allows a user explore relationships based on other relationships, it may be preferable to keep track of the route of exploration taken in case the user wants to back track and pursue another course of exploration. To this end, the GUI may be configured to effect the display of a running list of primary and new primary objects. This running list could be in text form and/or use symbols for user's ease. For example, referring to FIG. 2e, a display 200e is shown in which the running list 230 of primary objects is show. This particular example is based on the example above and displays images of Tom Cruise, Katie Holmes and Chris Klein.

The GUI may also be configured to return the user to the display corresponding to a primary object when the user indicates a level of interest in it. For example, the display 200e corresponding to Tom Cruise may be redisplayed if the user selects (e.g., double-clicks) on the image of Tom Cruise 231 in the running list 230.

The system 100 described above is useful in generating connections, recommended watch lists, alternative media and biographies, just to name a few. These processes are considered below in detail with reference to FIGS. 3-6.

Figure 3:
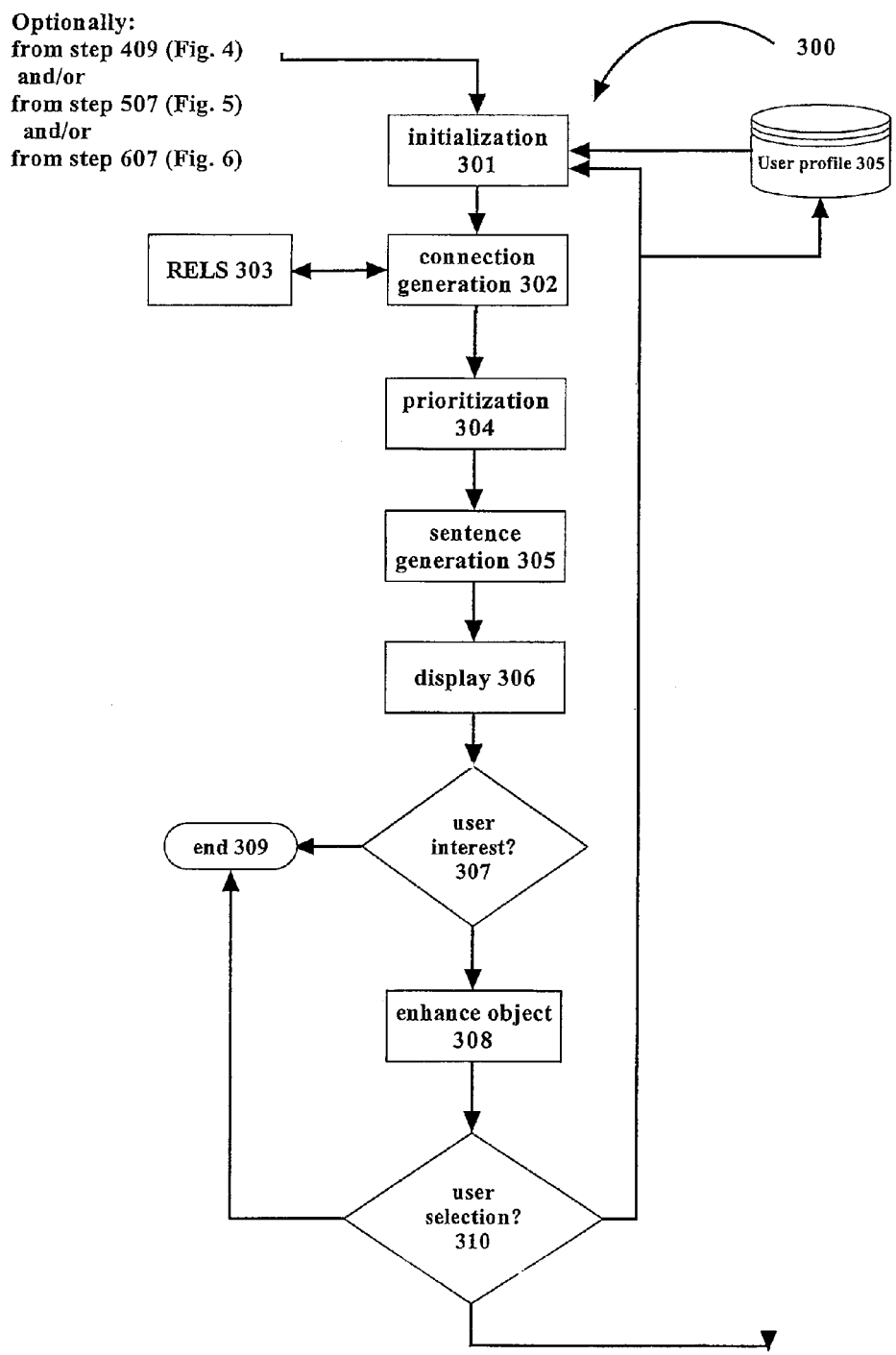
FIG. 3 shows a flow chart of a process of the present invention of generating connections using the system of FIG. 1.

Referring to FIG. 3, a flow chart 300 of a process of generating connections is shown. The process comprises generally (a) generating direct relationships among people, works, and tags from media content data; (b) establishing a primary person, work or tag; (c) connecting a primary person, work or tag to a first set of the people, works, and tags, wherein each person, work or tag of the first set has a direct relationship with the primary person, work or tag; (d) generating one or more secondary connections between the primary person, work or tag and a second set of the people, works, or tags, wherein each person, work or tag of the second set has at least (i) a plurality of direct relationships with the primary person, work, or tag, or (ii) a common direct relationship with the primary person, work, or tag; and (e) causing the display of at least a portion of the first and second sets.

More specifically, referring back to FIG. 3, the process starts with Step 301 in which a primary person, work or tag is initialized to begin the process. The initialization can be achieved in different ways including, for example, by virtue of a user's input or by system 100 automatically using, for instance, the user profile 105 or other information unrelated to the user, such as, for example, TV shows or movies which will be available shortly as discussed above with respect to the work availability data store 109.

Once a primary person work or tag is initiated in Step 301 the process continues to Step 302 to the connection generator 151. The connection generator 151 is associated with RELS 303 and generates both direct and secondary relationships between the primary person work or tags and the people works and tags of RELS 303.

Once the direct and secondary connections are established in Step 302, the process proceeds to Step 304, in which the connections are prioritized according to the various approaches described above to limit their number.

Once the number of connections is limited, the process proceeds to Step 305 in which the sentence generator 111 is used to provide an explanation, i.e., the relationship, behind the connection. For example, if the user indicates an interest in Westerns or actor A, the connection generator 151 would generate relationships involving Westerns or actor A, assess the priority of the relationships based on current programming choices, and recommend a currently-available western program that the user may want to watch. The output sentence may state something to the effect that since the user likes westerns and Actor A, you should watch program A which is a remake of a western in which Actor A originally stared.

Once the sentences are generated in Step 305 the process proceeds to Step 306 in which they are displayed in accordance with the graphical user interface described above. The GUI is able to interact with the user to determine if the user is interested in any of the connections displayed. To this end, the process proceeds to Step 307 in which determination is made on whether the user is interested in any displayed connection. For example, a determination is made whether the user had moved the cursor over a particular object on the display. If not, the process proceeds to Step 309 where it ends. If the user has moved the cursor over a portion of the object or indicated interest in some other manner, the process moves to Step 308 in which the object associated with the connection of interest is enhanced as described above with respect to the GUI.

From this point, the process moves to Step 310 in which a determination is made whether the user has not only shown interest in a particular connection, but also has selected it (e.g., by double clicking on it) as a new primary person, work or tag. If so, the user selection is used in connector generation of Step 302 and the process is reiterated. If the user has not selected the connection, the process proceeds to Step 309 where it ends.

Figure 4:
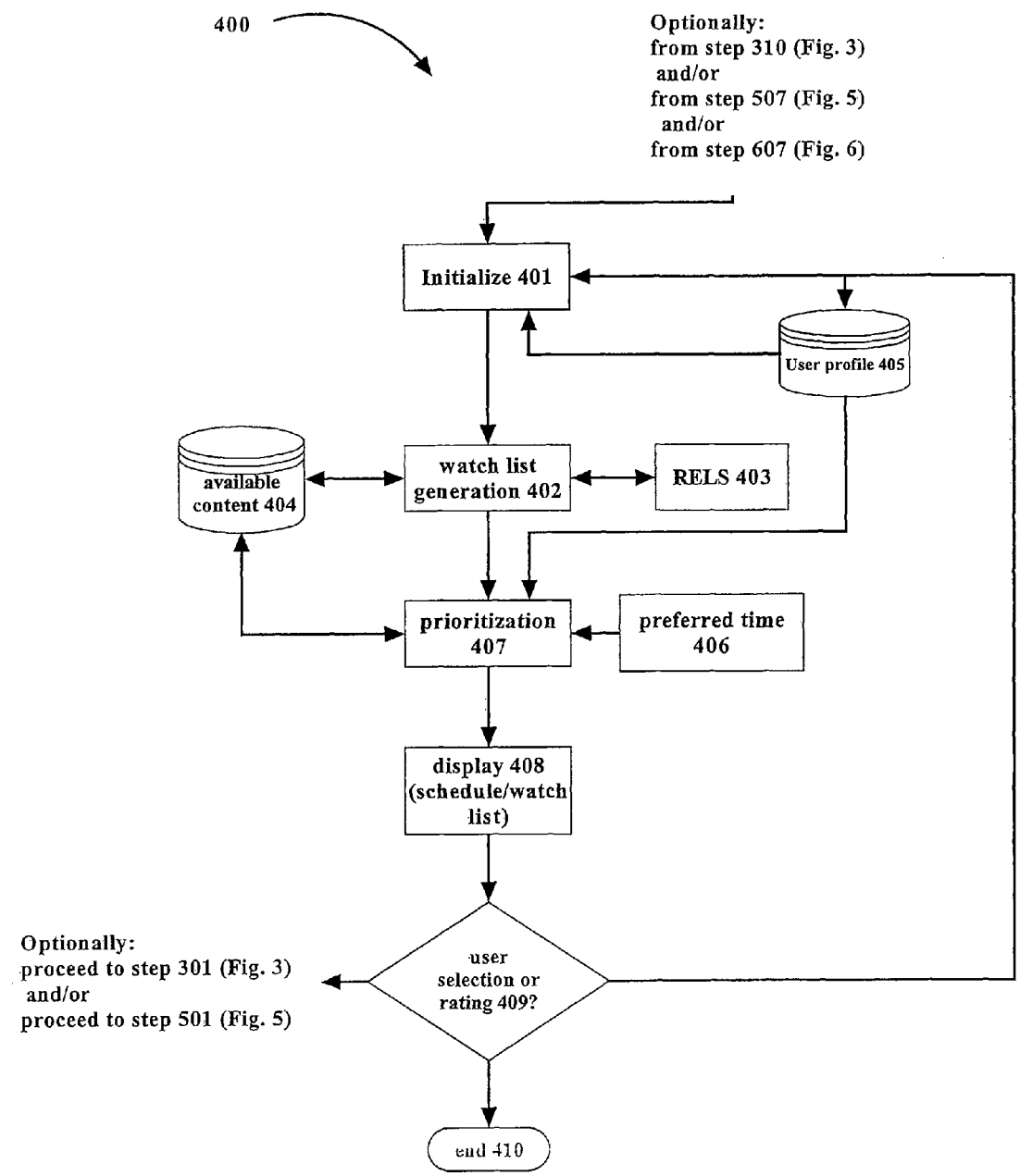
FIG. 4 shows a flow chart of a process of the present invention of generating a recommended watch list using the system of FIG. 1.

Referring to FIG. 4, a flow chart 400 of a process of generating a recommended watch list is disclosed. The process comprises generally: (a) identifying available works; (b) prioritizing said identified works based on at least one of timing of work availability or a user profile; and (c) generating a recommended watch list based on the prioritization of said identified available works. The recommended watch list may be in the form of a list or it may be organized as a schedule for viewing.

More specifically, the process begins with Step 401 in which the process is initialized by acquiring the user's profile if one exists. Additionally, a primary person, work or tag may be established in response to a user's selection from steps 310, 507, and 607 from the processes of 300, 500, and 600, respectively (see FIGS. 3, 5, and 6 and related text).

Once the process is initiated, it moves to Step 402 in which the watch list generator 152 obtains work availability information from data store 404. In one embodiment, the watch list generator may also correlate a primary person, work or tag (selected by the user or derived from the user's profile) with RELS 403 to generate connections based on the direct relationships as described above. These connections are then correlated with the available works in data store or data feed 109 to generate a list of programs associated with the primary person, work, or tag that are available for viewing within a certain period of time.

At this point, the process proceeds to Step 407 in which the works identified in Step 402 are prioritized using the approaches described above. Such priority may be based on the user's profile 405, the immediacy of the available programming, or a user-specified desired time for viewing 406. The immediacy of the available programming may reflect when a program will be no longer available or when a program becomes available. In one embodiment, the user-specified preferred time is used as a primary criterion for prioritizing the watch list. For example, the watch list displayed would only contain TV shows and movies available during the desired periods for viewing.

Once the watch list is prioritized, the process proceeds to Step 408 at which point the list is provided for display for the user. The watch list may include a list of recommended programming, or the recommended programming may be organized as a schedule. In one embodiment, the recommended programming is provided with a summary of the movie or program. The watch list may also be provided along with time and location information for viewing the recommended program. Furthermore, the watch list may provide links to download and view recommended program, particularly those programs that are available online.

In one embodiment, the reason for the recommendation is also provided. More specifically, rather than simply listing various programs and their time and location, the present system provides an explanation of why the user may want to watch the program. As with the sentence generator described with respect to Step 305 in process 300, the explanation of why a user should watch a particular show is derived from the nature of the relationship generated in the watch list generator 152. For example, the system may recommend Program A because the user "likes Actor X and Actor X stars in Program A." Likewise, the explanation may be related to the prioritization step. For example, the system may recommend Program A, because "its last broadcast is tomorrow."

Optionally, the process may proceed to Step 409, in which a determination is made on whether the user is interested in a particular recommendation. i.e., has the user selected any of the suggested programming? If so, the process proceeds back to Step 401 and the processes is reinitialized and reiterated based on the selected recommendation as a primary work. This allows the recommendation generator to focus in on the user's preferences. Furthermore, the user selection can also be used to further define the user profile 405. In one embodiment, the selection of a particular work involves rating the work (e.g., on a five point scale). Again, this rating is then used as feedback to refine the user profile. This feedback may also be shared with other users on the system to assist them in making viewing decisions.

Alternatively, rather than the process proceeding to Step 401, the user input may be used in the process 300 disclosed in FIG. 3. Specifically, the input from 409 can be used as the primary work for input into Step 302, and various connections can be generated and displayed for that particular work. For example, if the user was particularly interested in Movie A, that selection could be used as the primary work from which different connections to people, works and tags could be generated. In such an embodiment, the system may favor direct connections over derivative connections because the objective is to provide information particularly relevant to Movie A. For example, the system may provide images from scenes of Movie A, or images and biographies of the cast and crew associated with movie A.

In yet another embodiment, once a user's selection is identified in Step 409, it may be used as input in Step 502 to determine alternative media on which the particular work of interest is available (discussed below).

Figure 5:
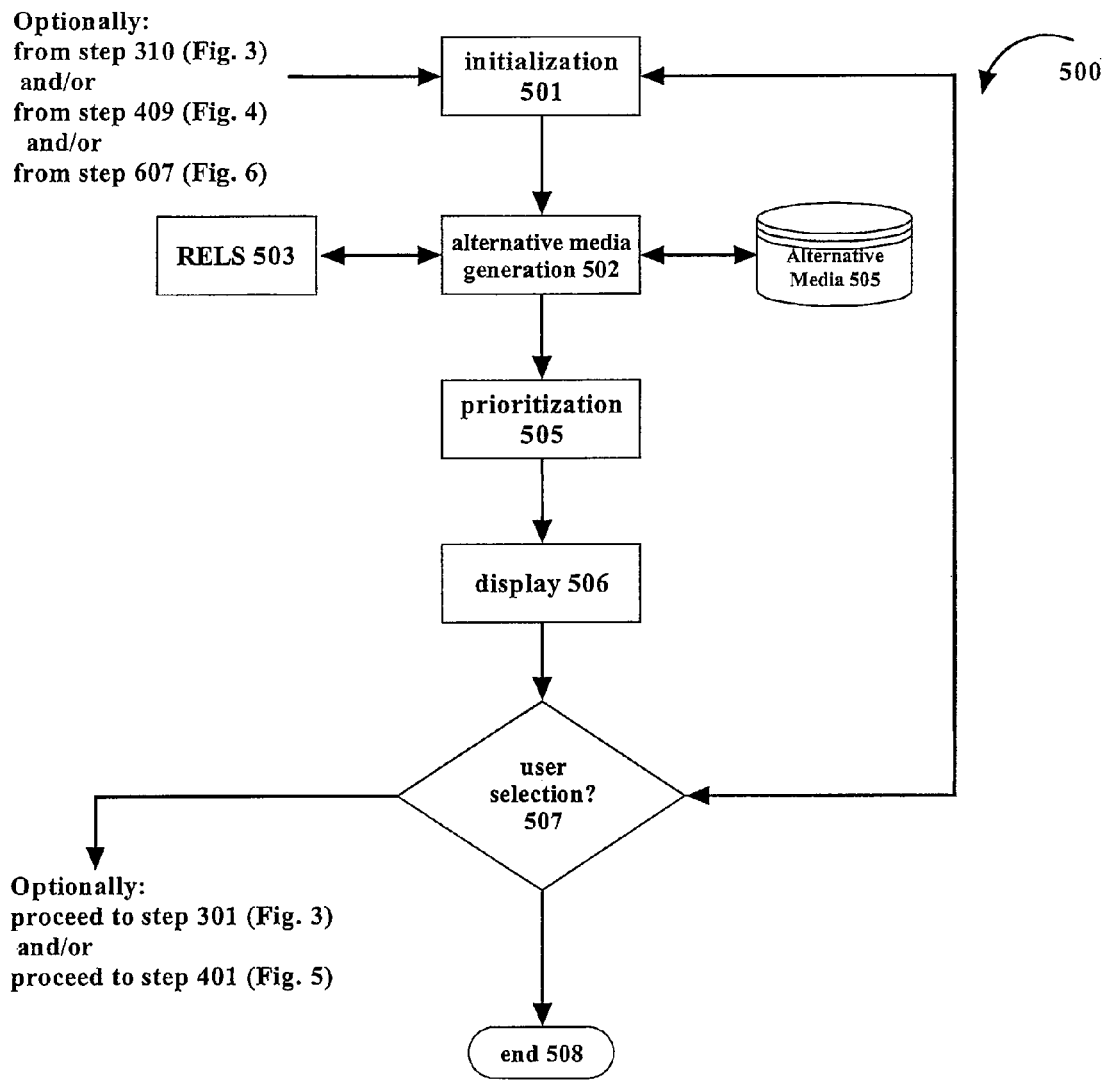
FIG. 5 shows a flow chart of a process of the present invention of generating list of alternative media using the system of FIG. 1.

Referring to FIG. 5, a flow chart 500 for a process of generating alternative media is shown. The process of correlating user interests to alternative media comprises generally: (a) establishing a primary person, work or tag; (b) connecting the primary person, work or tag to alternative media directly related to the primary person, work, or tag;

and (c) causing the display of a list of the alternative media. Specifically, referring to FIG. 5, the process begins with Step 501 in which the primary person, work or tag is initialized, as discussed with respect to FIGS. 3 and 4. In this step, however, rather than defining it broadly as including people, works and tags, this initialization step typically, but not necessarily, focuses on primary works such as TV shows and movies.

Once a primary work (i.e., movie or TV show) is established in Step 501, the process proceeds to Step 502 in which a list of alternative media is generated. To this end, the alternative media generator 153 connects the primary work to the alternative media from data store 501. Additionally, the alternative media generator 153 may also rely on RELS 503 to determine various connections for directly related alternative media.

Once the alternative media generator 153 makes the connections in Step 502, the process proceeds too Step 505 in which the alternative media is prioritized according to the user's preferred media preferences from data store 123 as described above. Once the listing of alternative media is prioritized, the list is displayed in Step 506.

At this point, the process moves to Step 507, in which a determination is made whether the user has indicated an interest in any of the alternative media connections displayed. If not, the process proceeds to Step 508 and ends. If so, the process may proceed back to Step 502, in which the alternative media generator is run again based on the user's selection as the new primary work, and the process reiterates itself. Optionally, or alternatively, the user's selection from 507 may also be used in the process 300 to determine interesting connections. Specifically, the input from Step 507 can be used as an indication of a primary person work or tag in Step 302 to determine interesting connections as described with respect to that figure. In yet another embodiment, the user's selection from Step 507 is used as input in the watch list generation process 400 described above.

Figure 6:
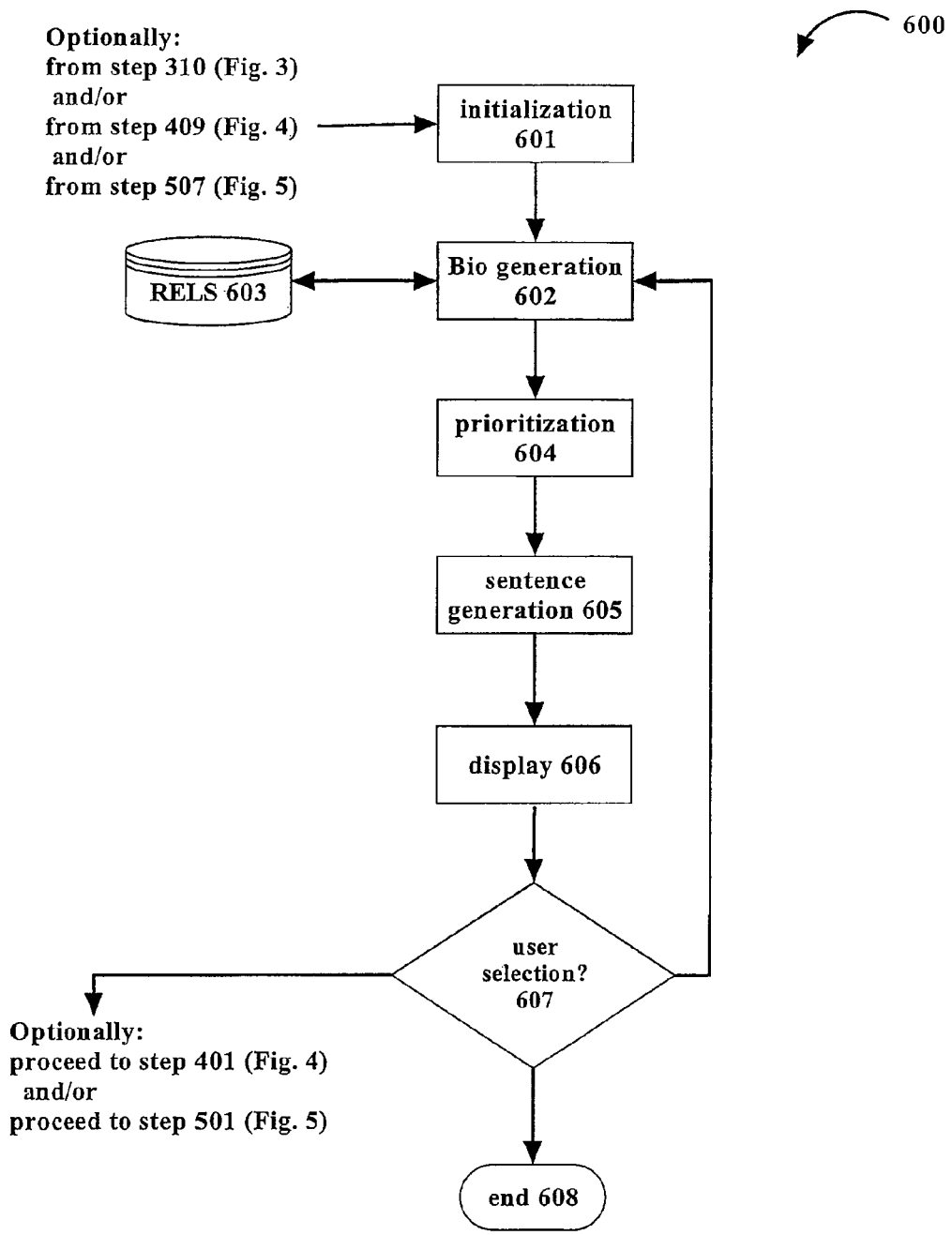
FIG. 6 shows a flow chart of a process of the present invention of generating a biography using the system of FIG. 1.

Referring to FIG. 6, the process related to biography generator 154 is shown in flow chart 600. The process of generating a biography on a person, such as, an artist comprises, generally, (a) establishing a primary person, (b) connecting the primary person to people, tags, and works, (c) prioritizing connections to limit their number, and (d) generating and causing the display of one or more sentences explaining the direct relationship associated with the limited number of connections. Specifically, in Step 601, the process is initialized by a user establishing a primary person of interest. Alternatively, the primary person is received from Steps 310, 407, and 507 described above.

At this point, the process proceeds to Step 602 in which the biography information is generated. Like the process 300 described above, this relies on RELS 603 which connects the primary person to other people, works and tags based on direct relationships. Once the biography connections are generated, the process proceeds to Step 604 in which the connections are prioritized according to the approaches mentioned above.

Once the biography connections are prioritized in Step 604, the process proceeds to Step 605 in which an explanation of the relationship between the connections is generated and caused to be displayed in Step 606. After Step 606, the process proceeds optionally to Step 607, in which a determination is made whether the user has shown any interest in the biography information displayed. If not, the process proceeds to Step 608, where it ends. If the user does show interest in some aspect of the primary person's biography, for example, by clicking onto an object corresponding to another person, work or tag, the process returns back to Step 602 in which the user's selection is used to establish a new primary person, work, or tag for use as input into the connection module. The connections generated in response to this input are used to augment the biography or the originally-inputted person. For example, if a biography of Actor A is generated and a variety of connections are displayed including those to Actor B, and the user indicates an interest in Actor B, then the biography generator 154 generates additional connections to Actor B to augment the biography of Actor A. This way, a biography of for a person of particular interest to a user can be generated with connections of particular interest to the user.

Alternatively, if a user selection is detected in Step 607, the process may proceed to Step 401 in process 400 in which a watch list is generated based on the user's selection as described above. Alternatively, if the user selects a work in Step 607, the process may proceed to step 501 in process 500, in which a list of media related to the work is generated.

Although the biography generator 154 is generally specific to a person, it should be understood, that it may be applied to works and even tags. For example, the biography generator 154 can be used to generate the background of a movie or film, as described. Furthermore, although the system and method of the present invention has been described with the respect to the embodiments disclosed herein, it should be understood that other embodiment exist and are covered by the claims that follow.

What is claimed is:

1. A method comprising:
   receiving, by a computing device, a user selection of a first media object;
   responsive to the user selection of the first media object, determining an association between the first media object and a second media object;
   retrieving a user-submitted review of the second media object; and
   based on the user-submitted review, generating a textual phrase indicating the association between the first media object and the second media object, wherein the textual phrase indicates an actor in the first media object and the second media object.

2. The method of claim 1, further comprising:
   outputting for display the textual phrase.

3. The method of claim 1, wherein the generating the textual phrase comprises determining a portion of the user-submitted review that corresponds to the association between the first media object and the second media object.

4. The method of claim 3, wherein the generating the textual phrase comprises:
   extracting a portion of the user-submitted review corresponding to the association between the first media object and second media object, and wherein the textual phrase comprises the portion of the user-submitted review corresponding to the association between the first media object and second media object.

5. The method of claim 1, further comprising:
   retrieving a second textual phrase associated with the second media object,
   wherein the textual phrase comprises at least a portion of the user-submitted review and the second textual phrase.

6. The method of claim 5, wherein the second textual phrase comprises at least a portion of a second user-submitted review of the second media object.

7. The method of claim 1, wherein the user-submitted review comprises a sentence description of a direct or indirect association between the first media object and the second media object.

8. The method of claim 1, wherein the determining the association between the first media object and the second media object comprises determining a direct association between the first media object and the second media object, and wherein the textual phrase comprises a sentence description of the direct association between the first media object and the second media object.

9. The method of claim 1, wherein the textual phrase indicates that the second media object comprises a remake, sequel, or pilot of the first media object or that the first media object comprises a remake, sequel, or pilot of the second media object.

10. The method of claim 1, wherein the determining the association between the first media object and the second media object comprises determining an indirect association, and wherein the textual phrase comprises a sentence description of the indirect association between the first media object and the second media object.

11. The method of claim 1, wherein the user-submitted review comprises an association between the second media object and a third media object.

12. The method of claim 11, wherein the determining the association between the first media object and the second media object comprises determining a direct association between the first media object and the second media object, and wherein the association between the second media object and the third media object comprises a direct association.

13. The method of claim 1, further comprising:
determining a first portion of the textual user-submitted review, wherein the first portion corresponds to a concept; and
determining a second portion of a second textual user-submitted review of the second media object, wherein the second portion corresponds to the concept and the textual phrase comprises the first portion and the second portion.

14. The method of claim 1, further comprising transmitting the textual phrase.

15. A method comprising:
receiving, by a computing device, a user selection of a first media object;
responsive to the user selection of the first media object, determining an association between the first media object and a second media object;
retrieving a user-submitted review of the second media object;
extracting, from the user-submitted review of the second media object, a textual description of the association between the first media object and the second media object; and
generating, based at least in part on the textual description, a textual phrase indicating the association between the first media object and the second media object, wherein the textual phrase indicates an actor in the first media object and the second media object.

16. The method of claim 15, wherein the determining the association between the first media object and the second media object comprises determining a direct association between the first media object and the second media object, and wherein the textual description comprises a sentence description of the direct association between the first media object and the second media object.

17. The method of claim 15, wherein the user-submitted review indicates the actor.

18. A method comprising:
receiving, by a computing device, a user selection of a first media object;
responsive to the user selection of the first media object, determining an association between the first media object and a second media object;
retrieving a textual user-submitted review of the second media object; and
based on the textual user-submitted review, generating a textual phrase comprising at least a portion of the textual user-submitted review, that indicates the association between the first media object and the second media object, wherein the textual phrase indicates an actor in the first media object and the second media object.

19. The method of claim 18, wherein the textual user-submitted review comprises a description of the association between the first media object and the second media object.

20. The method of claim 18, wherein the textual user-submitted review indicates that the second media object comprises a remake, sequel, or pilot of the first media object or that the first media object comprises a remake, sequel, or pilot of the second media object.

* * * * *

UNITED STATES PATENT AND TRADEMARK OFFICE
CERTIFICATE OF CORRECTION

PATENT NO.       : 9,489,444 B2                                      Page 1 of 1
APPLICATION NO. : 13/743180
DATED            : November 8, 2016
INVENTOR(S)      : Blaxland et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 149 days.

Signed and Sealed this

Twenty-fifth Day of September, 2018

Andrei Iancu
*Director of the United States Patent and Trademark Office*

UNITED STATES PATENT AND TRADEMARK OFFICE
CERTIFICATE OF CORRECTION

| | |
|---|---|
| PATENT NO. | : 9,489,444 B2 |
| APPLICATION NO. | : 13/743180 |
| DATED | : November 8, 2016 |
| INVENTOR(S) | : Thomas A. Blaxland et al. |

It is certified that error appears in the above-identified patent and that said Letters Patent is hereby corrected as shown below:

In the Claims

Claim 18, Column 24, Line 32:
Delete "phrase" and insert --phrase,--, therefor

Signed and Sealed this
First Day of November, 2022

Katherine Kelly Vidal
Director of the United States Patent and Trademark Office